3,479,347
3,4-DIHYDRO-2-QUINOXALINOL-6-CARBOXYLIC
ACID DERIVATIVES
Gerhard R. Wendt, Havertown, and Kurt W. Ledig, Philadelphia, Pa., assignors to American Home Products Corporation, New York, N.Y., a corporation of Delaware
No Drawing. Filed May 22, 1967, Ser. No. 640,394
Int. Cl. C07d 51/78
U.S. Cl. 260—240
10 Claims

ABSTRACT OF THE DISCLOSURE

The compound of the class of 3,4 - dihydro - 2-quinoxalinol - 6 - carboxylic acid derivatives useful as diuretic, anti-inflammatory and pituitary blocking agents.

BACKGROUND OF THE INVENTION

This invention relates to the field of new physiologically active 3,4 - dihydro - 2 - quinoxalinol - 6 - carboxylic acid derivatives and the novel process for their production.

S. Fatutta et al., in C. A. 53, 2244f (1959), describes the preparation of 3 - substituted -2(1H)-quinoxalinones. In British Patent No. 951,944 there is disclosed 3-benzyl-dihydroquinoxalone-(2) derivatives that are useful as analgesics.

SUMMARY OF THE INVENTION

More particularly, this invention is directed to compounds existing in the tautomeric forms:

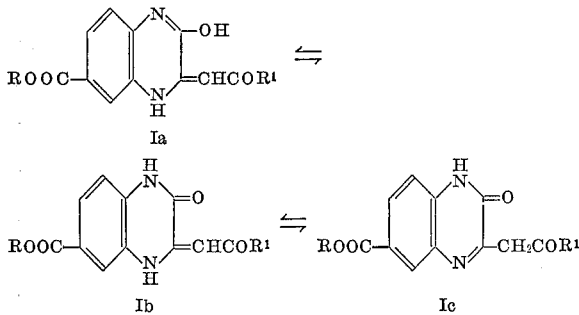

wherein R is selected from the group consisting of hydrogen, lower alkyl, cycloalkyl and benzyl; and $R^1$ is selected from the group consisting of lower alkyl, cycloalkyl of 3 to 6 carbon atoms, phenyl, halophenyl, lower alkyl phenyl, nitrophenyl, benzyl, lower alkoxy phenyl, pyridyl, furyl and thienyl.

It will be understood that while the compounds of the invention may exist in tautomeric equilibrium the dominant structure is the 3,4 - dihydro - 2 - quinolinol-6-carboxylic acid compound of Formula Ia and hereafter will represent all of the tautomeric forms of the compounds of this invention.

The terms "lower alkyl" and "lower alkoxy" as employed herein include both straight and branched chained radicals of less than 8 carbon atoms.

It will be understood that the halogen (chlorine, fluorine, bromine or iodine), nitro, lower alkoxy and lower alkyl group may be attached to either the o-, the m- or the p-position of the phenyl. For purposes of this invention, the various halogens are equivalent.

The compounds of this invention are physiologically active substances which are useful as diuretic, and anti-inflammatory agents.

The compounds of the present invention can be prepared and administered to warm-blooded animals in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablets-disintegrating agents: it can also be an encapsulating material. In powders the carrier is a finely divided solid which is in admixture with the finely divided compound. In the tablet the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methylcellulose, sodium carboxymethylcellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly cachets are included. Tablets, powders, cachets and capsulates can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methylcellulose, sodium carboxymethylcellulose and other well known suspending agents.

Preferably, the pharmaceutical preparation is in unit dosage form. In such form the preparation is sub-divided in unit doses containing appropriate quantities of the compound, the unit dosage form can be a packaged preparation, the package containing discrete quantities of preparation, for example, packeted powders of vials or ampoules.

The unit dosage form can be a capsule, cachet or tablet iself or it can be the appropriate number of any of those in packaged form. The quantity of compound in a unit dose of preparation may be varied or adjusted from a 1 mg. to 100 mg. according to the particular application and the potency of the active ingredient.

In therapeutic use the preparations are administered at the initial dosage of about 5 mg. to 25 mg. per kilogram daily. The dosages, however, may be varied depending upon the requirements of the patient.

DESCRIPTION OF THE PREFERRED EMBODIMENTS

The compound of this invention may be prepared according to the process of this invention which may be represented by the following reaction scheme wherein R and $R^1$ are as hereinbefore defined, and $R^2$ is hydrogen or alkyl:

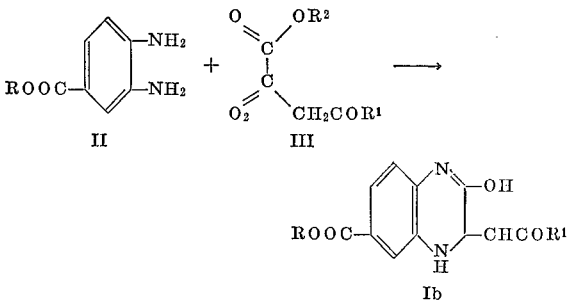

In accordance with the invention, the 3,4-diaminobenzoic acid compounds of Formula II are reacted with the pyruvic acid compounds of Formula III, or its alkali metal salts, at elevated temperatures in an inert solvent, preferably at the reflux temperature of the mixture, to yield the 3,4 - dihydro - 2 - quinoxalinol-6-carboxylic acid compounds of Formula Ib which are the final products of this invention.

The initial compounds of Formulae II and III are known compounds which are commercially available or may be prepared by any conventional method.

The following examples illustrate the invention (all temperatures being in centigrade):

EXAMPLE 1

3,4-dihydro-2-hydroxy-3-isonicotinoylmethylene-6-quinoxaline carboxylic acid, hemihydrate A solution of 10.7 gm. (44.0 mmoles) of 3,4-diaminobenzoic acid in 100 ml. of water, 100 ml. of ethanol and 5 ml. of acetic acid is refluxed with a solution of 6.7 gm. (44.0 mmoles) of the sodium derivative of isonicotinoyl pyruvic acid, ethyl ester in 100 ml. of water for a few minutes (pH=4). The resulting precipitate is filtered and recrystallized twice from N,N-dimethylformamide-methanol (1:1), yielding 1.0 gm. (7.5%) of 3,4-dihydro-2-hydroxy - 3-isonicotinoylmethylene-6-quinoxaline-carboxylic acid, hemihydrate, M.P. >300°.

$\lambda_{max}^{KBr}$ 3.25, 5.87 and 6.22$\mu$

*Analysis.*—Calcd. for $C_{16}H_{11}N_3O_4 \cdot \frac{1}{2}H_2O$: C, 60.37; H, 3.80; N, 13.20; $H_2O$, 2.83%. Found: C, 61.22; H, 4.07; N, 13.14; $H_2O$, 2.93%.

EXAMPLE 2

3-acetonylidene-3,4-dihydro-2-hydroxy-6-quinoxaline carboxylic acid

A solution of 15.2 gm. (100 mmoles) of 3,4-diaminobenzoic acid in 350 ml. of alcohol is refluxed with a solution of 18.0 gm. (100 mmoles) of the sodium derivative of ethyl aceto pyruvate in 125 ml. of water and 25 ml. of acetic acid (pH 5). The resulting precipitate is collected and recrystallized from N,N-dimethylformamide-water (1:1), yielding 10.7 gm. (43.5%) of 3-acetonylidene-3,4-dihydro-2-hydroxy-6-quinoxaline carboxylic acid, M.P. >300°.

*Analysis.*—Calcd. for $C_{12}H_{10}N_2O_4$: C, 58.53; H, 4.09; N, 11.38%. Found: C, 58.16; H, 4.24; N, 11.42%.

EXAMPLE 3

3,4-dihydro-2-hydroxy-3-isonicotinoylmethylene-6-quinoxaline carboxylic acid, ethyl ester A solution of 9.0 gm. (50.0 mmoles) of 3,4-diaminobenzoic acid, ethyl ester in 20 ml. of alcohol and 5 ml. of acetic acid is refluxed with a solution of 12.2 gm. (50.0 mmoles) of the sodium derivative of isonicotinoyl pyruvic acid, ethyl ester in 100 ml. of water for a few minutes (pH≅4.0). The resulting precipitate is filtered and recrystallized twice with N,N-dimethylformamide/methanol (1:1), yielding 3.0 gm. (18.0%) of 3,4-dihydro-2-hydroxy-3 - isonicotinoylmethylene - 6-quinoxaline carboxylic acid ethyl ester, M.P. 258–261°.

*Analysis.*—Calcd. for $C_{18}H_{15}N_3O_4$: C, 64.09; H, 4.48; N, 12.46%. Found: C, 63.69; H, 4.18; N, 12.35%.

EXAMPLE 4

3-acetonylidene-3,4-dihydro-2-hydroxy-6-quinoxaline carboxylic acid, ethyl ester A solution of (100 mmoles) 18.0 gm. of the sodium derivative of ethyl aceto pyruvate in 100 ml. of water is treated with 18.0 gm. (100 mmoles) of 3,4-diaminobenzoic acid, ethyl ester in 200 ml. of aqueous ethanol (50% dilution) and 10 ml. of acetic acid (ph~5). The resulting precipitate is collected and recrystallized from N,N-dimethylformamide to yield 7.3 gm. (27%) of 3-acetonylidene - 3,4 - dihydro - 2-hydroxy-6-quinoxaline carboxylic acid, ethyl ester, M.P. 234–238°.

*Analysis.*—Calcd. for $C_{14}H_{14}N_2O_4$: C, 61.31; H, 5.15; N, 10.21%. Found: C, 61.45; H, 5.12; N, 10.28%.

EXAMPLE 5

3-acetonylidene-3,4-dihydro-2-hydroxy-6-quinoxaline carboxylic acid, benzyl ester Following the procedure of Example 4, but substituting 3,4-diaminobenzoic acid, benzyl ester for 3,4-diaminobenzoic acid, ethyl ester there is obtained 3-acetonylidene-3,4 - dihydro - 2 - hydroxy - 6-quinoxaline carboxylic acid, benzyl ester.

EXAMPLE 6

3-acetonylidene-3,4-dihydro-2-hydroxy-6-quinoxaline carboxylic acid, methyl ester Following the procedure of Example 4, but substituting 3,4-diaminobenzoic acid, methyl ester for 3,4-diaminobenzoic acid, ethyl ester there is obtained 3-acetonylidene-3,4 - dihydro - 2 - hydroxy-6-quinoxaline carboxylic acid, methyl ester.

EXAMPLE 7

3-acetonylidene-3,4-dihydro-2-hydroxy-6-quinoxaline carboxylic acid, propyl ester Following the procedure of Example 4, but substituting 3,4-diaminobenzoic acid, propyl ester for 3,4-diaminobenzoic acid, ethyl ester there is obtained 3-acetonylidene-3,4 - dihydro - 2 - hydroxy - 6-quinoxaline carboxylic acid, propyl ester.

EXAMPLE 8

3-acetonylidene-3,4-dihydro-2-hydroxy-6-quinoxaline carboxylic acid, butyl ester Following the procedure of Example 4, but substituting 3,4-diaminobenzoic acid, butyl ester for 3,4-diaminobenzoic acid, ethyl ester there is obtained 3-acetonylidene-3,4-dihydro-2-hydroxy-6-quinoxaline carboxylic acid, butyl ester.

EXAMPLE 9

3-acetonylidene-3,4-dihydro-2-hydroxy-6-quinoxaline carboxylic acid, cyclohexyl ester Following the procedure of Example 4, but substituting 3,4-diaminobenzoic acid, cyclohexyl ester for 3,4-diaminobenzoic acid, ethyl ester there is obtained 3-acetonylidene-3,4 - dihydro - 2 - hydroxy - 6-quinoxaline carboxylic acid, cyclohexyl ester.

EXAMPLE 10

3,4-dihydro-2-hydroxy-3-phenacylidene-6-quinoxaline carboxylic acid, ethyl ester Following the procedure of Example 4, but substituting the sodium derivative of benzoyl pyruvic acid, ethyl ester for the sodium derivative of ethyl aceto pyruvate there is obtained 3,4 - dihydro-2-hydroxy-3-phenacylidene-6-quinoxaline carboxylic acid, ethyl ester.

EXAMPLE 11

3,4-dihydro-2-hydroxy-3-(m-nitrophenacylidene)-6-quinoxaline carboxylic acid, ethyl ester Following the procedure of Example 4, but substituting the sodium derivative of m-nitrobenzoyl pyruvic acid, ethyl ester for the sodium derivative of ethyl aceto pyruvate there is obtained 3,4-dihydro-2-hydroxy-3(m-nitrophenacylidene)-6-quinoxaline carboxylic acid, ethyl ester.

EXAMPLE 12

3-(o-chlorophenacylidene)-3,4-dihydro-2-hydroxy-6-quinoxaline carboxylic acid, ethyl ester Following the procedure of Example 4, but substituting the sodium derivative of o-chlorobenzoyl pyruvic acid, ethyl ester for the sodium derivative of ethyl aceto pyruvate there is obtained 3-(o-chlorophenacylidene)-3,4-dihydro-2-hydroxy-6-quinoxaline carboxylic acid, ethyl ester.

EXAMPLE 13

3,4-dihydro-2-hydroxy-3-(m-methoxyphenacylidene)-6-quinoxaline carboxylic acid, ethyl ester Following the procedure of Example 4, but substituting the sodium derivative of m-methoxybenzoyl pyruvic acid, ethyl ester for the sodium derivative of ethyl aceto pyruvate there is obtained 3,4-dihydro-2-hydroxy-3-(m-methoxyphenacylidene)-6-quinoxaline carboxylic acid, ethyl ester.

EXAMPLE 14

3,4-dihydro-2-hydroxy-3-(m-propylphenacylidene)-6-quinoxaline carboxylic acid, ethyl ester Following the procedure of Example 4, but substituting the sodium derivative of m-propylbenzoyl pyruvic acid, ethyl ester for sodium derivative of ethyl aceto pyruvate there is obtained 3,4-dihydro-2-hydroxy-3-(m-propylphenacylidene)-6-quinoxaline carboxylic acid, ethyl ester.

EXAMPLE 15

3-(p-ethoxyphenacylidene)-3,4-dihydro-2-hydroxy-6-quinoxaline carboxylic acid, ethyl ester Following the procedure of Example 4, but substituting the sodium derivative of p-ethoxybenzoyl pyruvic acid, ethyl ester for the sodium derivative of ethyl aceto pyruvate there is obtained 3-(p-ethoxyphenacylidene)-3,4-dihydro-2-hydroxy-6-quinoxaline carboxylic acid, ethyl ester.

EXAMPLE 16

3,4-dihydro-2-hydroxy-3-(cyclohexylcarbonyl)methylene-6-quinoxaline carboxylic acid, ethyl ester Following the procedure of Example 4, but substituting the sodium derivative of 3-(cyclohexylcarbonyl) pyruvic acid, ethyl ester for the sodium derivative of ethyl aceto pyruvate there is obtained 3,4-dihydro-2-hydroxy-3-(cyclohexylcarbonyl)methylene-6-quinoxaline carboxylic acid, ethyl ester.

EXAMPLE 17

3,4-dihydro-2-hydroxy-3-(cyclopropylcarbonyl)methylene-6-quinoxaline carboxylic acid, ethyl ester Following the procedure of Example 4, but substituting the sodium derivative of 3-(cyclopropylcarbonyl) pyruvic acid, ethyl ester for the sodium derivative of ethyl aceto pyruvate there is obtained 3,4-dihydro-2-hydroxy-3-(cyclopropylcarbonyl)methylene-6-quinoxaline carboxylic acid, ethyl ester.

EXAMPLE 18

3,4-dihydro-2-hydroxy-3-(2-thenoyl)methylene-6-quinoxaline carboxylic acid, ethyl ester Following the procedure of Example 4, but substituting the sodium derivative of ethyl (2-thenoyl)pyruvate for the sodium derivative of ethyl aceto pyruvate there is obtained 3,4-dihydro-2-hydroxy-3-(2-thenoyl)methylene-6-quinoxaline carboxylic acid, ethyl ester.

EXAMPLE 19

3,4-dihydro-2-hydroxy-3-(2-furoyl)methylene-6-quinoxaline carboxylic acid, ethyl ester Following the procedure of Example 4, but substituting the sodium derivative of ethyl (2-furoyl) pyruvate for the sodium derivative of ethyl aceto pyruvate there is obtained 3,4-dihydro-2-hydroxy-3-(2-furoyl)methylene - 6 - quinoxaline carboxylic acid, ethyl ester.

The invention may be variously otherwise embodied within the scope of the appended claims.

What is claimed is:

1. A compound of the formula

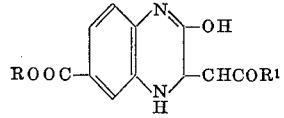

wherein R is selected from the group consisting of hydrogen, lower alkyl, cycloalkyl having 3 to 6 carbons and benzyl, and $R^1$ is selected from the group consisting of lower alkyl, cycloalkyl having 3 to 6 carbons, phenyl, halophenyl, lower alkyl phenyl, nitrophenyl, lower alkoxy phenyl, benzyl, pyridyl, furyl and thienyl.

2. A compound according to claim 1 that is 3,4-dihydro-2-hydroxy-3-isonicotinoylmethylene - 6 - quinoxaline carboxylic acid.

3. A compound according to claim 1 that is 3-acetonylidene-3,4-dihydro-2-hydroxy-6 - quinoxaline carboxylic acid.

4. A compound according to claim 1 that is 3,4-dihydro-2-hydroxy-3-isonicotinoylmethylene - 6 - quinoxaline carboxylic acid, ethyl ester.

5. A compound according to claim 1 that is acetonylidene-3,4-dihydro-2-hydroxy - 6 - quinoxaline carboxylic acid, ethyl ester.

6. A compound according to claim 1 that is 3-acetonylidene-3,4-dihydro-6-quinoxaline carboxylic acid, benzyl ester.

7. A compound according to claim 1 that is 3-acetonylidene-3,4-dihydro-6-quinoxaline carboxylic acid, methyl ester.

8. A compound according to claim 1 that is 3,4-dihydro-2-hydroxy-3-phenacylidene-6-quinoxaline carboxylic acid, ethyl ester.

9. A compound according to claim 1 that is 3,4-dihydro-2-hydroxy-3-(m-nitrophenacylidene) - 6 - quinoxaline carboxylic acid, ethyl ester.

10. A compound according to claim 1 that is 3,4-dihydro-2-hydroxy-3-(2-thenoyl)methylene-6-quinoxaline carboxylic acid, ethyl ester.

References Cited

UNITED STATES PATENTS 3,255,192   7/1966   Chang _____ 260—250

NICHOLAS S. RIZZO, Primary Examiner

U.S. Cl. X.R.
260—250; 424—250